(12) United States Patent
Rooney

(10) Patent No.: US 6,207,121 B1
(45) Date of Patent: Mar. 27, 2001

(54) COMPOSITION AND PROCESS FOR REMOVAL OF ACID GASES

(75) Inventor: Peter C. Rooney, Lake Jackson, TX (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/163,824

(22) Filed: Sep. 30, 1998

(51) Int. Cl.$^7$ .......................... C01B 31/20; C01B 17/16; C07C 213/00; C07C 215/00; C09K 3/00
(52) U.S. Cl. .......................... 423/228; 423/226; 423/229; 564/475; 564/477; 564/503; 564/511; 252/189; 252/190
(58) Field of Search ...................................... 423/226, 228, 423/229; 564/475, 477, 503, 511; 252/189, 190

(56) References Cited

U.S. PATENT DOCUMENTS

| | | | |
|---|---|---|---|
| 3,908,009 | * 9/1975 | Polemenakos et al. | 252/401 |
| 3,953,512 | * 4/1976 | Belzecki | 564/477 |
| 4,239,504 | * 12/1980 | Polizzotti | 423/215.5 |
| 4,294,588 | * 10/1981 | Polizzotti | 95/58 |
| 4,336,233 | 6/1982 | Appl et al. | 423/228 |
| 5,209,914 | 5/1993 | Peytavy et al. | 423/228 |
| 5,366,709 | 11/1994 | Peytavy et al. | 423/228 |

FOREIGN PATENT DOCUMENTS

| | | |
|---|---|---|
| 1091429 | 12/1980 | (CA) . |
| 0 647 462 | 4/1995 | (EP) . |
| 7 800 153 | 7/1978 | (NL) . |

OTHER PUBLICATIONS

A Kohl and R. Nielsen, *Gas Purification*, 5$^{th}$ edition, Gulf Publishing, (1997), pp. 1369–1373.
A. Kohl and F.C. Riesenfeld, *Gas Purification*, 4$^{th}$ edition, Gulf Publishing, (1985), pp. 875–879.
A. Kohl, F.C. Riesenfeld, *Gas Purification*, 3$^{th}$ edition, Gulf Publishing, (1979), pp. 797–800.
Dow, *The Gas Conditioning Fact Book*, (1962), pp. 387–391 Only.
O. F. Dawodu and A. Meisen, *Chem. Eng. Comm.*, Effects of Composition on the Performance of Alkanolamine Blends For Gas Sweetening, vol. 144, pp. 103–112, (1996).
P. E. Holub, J.E. Critchfield, and W. Su, 48$^{th}$ Annual Laurance Reid Gas Conditioning Conference, "Amine Degradation Chemistry in CO$_2$ Service", Norman, OK,Mar. 1–4, pp. 146–160, (1998).
C J. Kim, *Industrial Eng. Chem. Res.*, "Degradation of Alkanolamines in Gas–Treating Solutions: Kinetics of Di–2 propanolamine Degradation in Aqueous Solutions Containing Carbon Dioxide", vol. 27, pp. 1–3, (1988).

* cited by examiner

*Primary Examiner*—Steven P. Griffin
*Assistant Examiner*—Jonas N. Strickland

(57) ABSTRACT

Alkanolamines of the formula $$R-NHCH_2CH(OH)CH_2CH_3 \qquad (I)$$

or mixtures thereof wherein R is H, —CH$_2$CH(OH)CH$_2$CH$_3$, an alkyl group having from 1 to 6 carbon atoms, an aryl group having from 6 to 12 carbon atoms, an aralkyl group having from 6 to 12 carbon atoms, or a cycloalkyl group having from 3 to 6 carbon atoms in combination with a tertiary alkano/amine are effective in the removal of acidic gases from a fluid stream containing same and show superior degradation properties as compared to alkanolamines conventionally used in the gas purification applications.

36 Claims, No Drawings

COMPOSITION AND PROCESS FOR REMOVAL OF ACID GASES

This invention relates to a composition and method for removing acid gases such as, for example, $H_2S$, $CO_2$ and COS from a fluid stream containing same.

BACKGROUND OF THE INVENTION

Purification of fluids involves removal of impurities from fluid steams. Various fluid purification methods are known and practiced. These fluid purification methods generally fall in one of the following categories: absorption into a liquid, adsorption on a solid, permeation through a membrane, chemical conversion to another compound, and condensation. The absorption purification method involves the transfer of a component of a fluid to a liquid absorbent in which said component is soluble. If desired, the liquid containing the transferred component is subsequently stripped to regenerate the liquid. See, for example, A. Kohl and R. Nielsen, "Gas Purification, $5^{th}$ edition, Gulf Publishing, 1997; A. Kohl and F. C. Riesenfeld "Gas Purification, $4^{th}$ edition, Gulf Publishing, 1985; A. Kohl and F. C. Riesenfeld "Gas Purification, 3rd edition, Gulf Publishing, 1979; and "The Gas Conditioning Fact Book" published by The Dow Chemical of Canada, Limited, 1962; all incorporated herein by reference.

Aqueous solutions of various primary, secondary and tertiary alkanolamines, such as, for example, monoethanolamine(MEA), diethanolamine (DEA), diglycolamine (DGA), diisopropanolamine (DIPA), methyldiethanolamine (MDEA) and triethanolamine (TEA), have been used as absorbent liquids to remove acid gases from liquid and gas streams. In a regeneration method, the aqueous alkanolamine solution containing acid gas is then subjected to heat to regenerate the aqueous alkanolamine solution.

Primary alkanolamines such as MEA and DGA, or secondary alkanolamines such as DEA or DIPA are generally suitable for highly exhaustive removal of $CO_2$, however they have disadvantage of requiring large expenditure of energy for regeneration.

Tertiary alkanolamines, especially MDEA and TEA, require less energy consumption for regeneration, but since they do not react directly with $CO_2$, they do not remove $CO_2$ completely from the fluid stream. Tertiary alkanolamines are, however, suitable for selective removal of $H_2S$ from a fluid containing both $H_2S$ and $CO_2$, since the absorption rate for $H_2S$ is about the same for all alkanolamines.

The chemistry of acid gas reactions with aqueous alkanolamine treating solutions is well known and is described in many publications such as, for example, the aforementioned publications and references cited therein, and publications described below and references cited therein.

Canadian Patent No. 1,091,429 (G. Sartori et al) describes the use of aqueous solutions containing water-soluble primary monoamines having a secondary carbon atom attached to the amino group in gas purification applications. Primary monoamines having a secondary carbon atom attached to the amino group specifically mentioned in this reference as being suitable are 2-amino-1-propanol, 2-amino-1-butanol, 2-amino-3-methyl-1-butanol, 2-amino-1-pentanol, 2-amino-1-hexanol and 2-aminocycloxexanol. It is notable that this reference is completely silent as to degradability and corrosivity of these primary monoamines which have a secondary carbon atom attached to the amino group.

Chem. Eng. Comm., 1996, Vol. 144, pp. 103–112, "Effects of Composition on the Performance of Alkanolamine Blends for Gas Sweetening", describes the influence of blend composition and components on some of the parameters which can be used to monitor the performance of amine blends for aqueous blends of MDEA and MEA, MDEA and DEA, and MDEA and DIPA.

$48^{th}$ Annual Laurance Reid Gas Conditioning Conference, Mar. 1–4, 1998, pp. 146–160, "Amine Degradation Chemistry in $CO_2$ Service", describes the degradation chemistry of various ethanolamines in $CO_2$ service. The paper promotes gas treating solvents which are not formulated with primary or secondary ethanolamines as a solution for the loss rates associated with the use of various ethanolamines such as MDEA, MMEA and DEA.

Primary and secondary alkanolamines can also be used as activators in combination with tertiary alkanolamines to remove $CO_2$ down to as low as 100 parts per million (ppm) or less requiring less regeneration energy than is required using the primary or secondary alkanolamines alone.

U.S. Pat. Nos. 5,209,914 and 5,366,709 show how activators such as ethylmonoethanolamine (EMEA) or butylmonoethanolamine (BMEA) can be used with MDEA to achieve better $CO_2$ removal than MDEA alone.

U.S. Pat. No. 4,336,233 discloses that the use of a combination of piperazine and MDEA results in an improved acid gas removal. However, one particular disadvantage of piperazine is that piperazine carbamate formed from the reaction of piperazine and $CO_2$ is not soluble in the aqueous MDEA/piperazine solution. Thus, the additive level is limited up to about only 0.8 moles/liter, which severely limits the capacity of the solvent, or requires higher circulation rates to treat the same amount of fluid than other MDEA/alkanolamine activator blends require.

The primary disadvantage of using primary and secondary alkanolamines such as MEA, DEA and DIPA is that $CO_2$ reacts with these alkanolamines to form degradation compounds such as oxazolidinones and ethylenediamines. C. J. Kim, Ind. Eng. Chem. Res. 1988, 27, and references cited therein show how DEA reacts with $CO_2$ to form 3-(2-hydroxyethyl)-2-oxazolidi-none (HEO) and N,N,N'-tris(2-hydroxyethyl)ethylenediamine (THEED). This reference also shows how DIPA reacts to form 3-(2-hydroxypropyl)-5-methyl-2-oxazolidinone (HPMO). These degradation compounds reduce the amount of alkanolamine available for acid gas removal, increase the viscosity of the solution and potentially increase the corrosivity of the solvent.

It is evident that there is still a great need and interest in the gas purification industry for alkanolamine compounds which will be effective in the removal of acidic gases from fluid streams and will have improved degradation properties compared to alkanolamines commonly used for this purpose.

It has now been discovered that 1-amino-2-butanol and its derivatives are effective in removing acidic gases from fluid stream and that they have superior degradation properties as compared to alkanolamines conventionally used in the gas purification industry.

In the context of the present invention the term "fluid stream" encompasses both a gaseous stream and liquid stream.

SUMMARY OF THE INVENTION

In one aspect the present invention is an aqueous solution adapted for use in the removal of acidic gases from a fluid stream containing same, said aqueous solution comprising an effective amount of an alkanolamine of the formula

or mixtures thereof wherein R is H, —CH$_2$CH(OH)CH$_2$CH$_3$, an alkyl group having from 1 to 6 carbon atoms, an aryl group having from 6 to 12 carbon atoms, an aralkyl group having from 6 to 12 carbon atoms, or a cycloalkyl group having from 3 to 6 carbon atoms.

In another aspect the present invention is a process for removing acidic gases from a fluid stream containing same, said process comprising contacting said fluid stream containing acidic gases with an aqueous solution comprising an effective amount of an alkanolamine of the formula

or mixtures thereof wherein R is H, —CH$_2$CH(OH)CH$_2$CH$_3$, an alkyl group having from 1 to 6 carbon atoms, an aryl group having from 6 to 12 carbon atoms, an aralkyl group having from 6 to 12 carbon atoms, or a cycloalkyl group having from 3 to 6 carbon atoms.

DETAILED DESCRIPTION OF THE INVENTION

The alkanolamines of the formula I above are surprisingly found to be effective for removing acidic gases, particularly CO$_2$, H$_2$S, COS or mixtures thereof, from a fluid stream containing same and yet exhibit much improved degradation properties compared to alkanolamines conventionally used in the gas purification industry. These compounds are known and their synthesis is described in various publications such as, for example, J. Zienko, M. Stoyanowa-Antoszczyszyn and J. Myszkowski, Chemik 1/1991, pp. 8–9, and references cited therein.

The alkanolamines of formula I in which R is H, —CH$_2$CH(OH)CH$_2$CH$_3$, or an alkyl group having from 1 to 6 carbon atoms are preferred in the practice of the present invention with those in which R is H, —CH$_2$CH(OH)CH$_2$CH$_3$, or an alkyl group having from 1 to 4 carbon atoms being further preferred. 1-Amino-2-butanol (MBA) and bis(1-hydroxybutyl)-amine (DBA), N-methyl-2-hydroxybutylamine and N-ethyl-2-hydroxybutylamine are particularly preferred, with 1-amino-2-butanol and bis(1-hydroxybutyl)amine (DBA) being the most preferred alkanolamines for use in the present invention.

The alkyl group having from 1 to 6 carbon atoms contemplated by R in formula I can be straight or branched chain alkyl group. Non-limiting examples of such alkyl groups are methyl, ethyl, propyl, isopropyl, butyl, isobutyl, pentyl, and hexyl.

The aryl group having from 6 to 12 carbon atoms contemplated by R in formula I can be substituted or non-substituted. Non-limiting examples of suitable aryl groups are phenyl and tolyl.

The aralkyl group having from 6 to 12 carbon atoms contemplated by R in formula I can be substituted or unsubstituted. Non-limiting examples of suitable aralkyl groups are benzyl and phenethyl.

The cycloalkyl group having from 3 to 12 carbon atoms contemplated by R in formula I can be substituted or unsubstituted. Non-limiting examples of suitable cycloalkyl groups are cylclohexyl and methylcyclohexyl.

In the present invention, the aqueous solution of an alkanolamine of formula I can be used alone, or in combination with tertiary alkanolamines such as, for example, methyldiethanolamine (MDEA), dimethylethanolamine (DMEA) and triethanolamine (TEA) to remove acidic gases from fluids.

The alkanolamine of formula I is present in the aqueous solution of the present invention in an amount effective to remove acidic gases from a fluid stream.

When the alkanolamine of formula I is used alone, it is typically present in an amount of from about 7 to about 50, preferably from about 15 to about 40, more preferably from about 20 to about 30, percent by weight based on the total weight of the aqueous solution.

The optimal amount of the alkanolamine of formula I will depend on the fluid stream composition, outlet fluid requirement, circulation rate, and energy available for stripping the solvent. A person of ordinary skill in the art would readily determine the optimal amount of the alkanolamine of formula I.

When the alkanolamine of formula I is used as an activator in combination with a tertiary alkanolamine, the amount used can vary quite widely, but it is generally present in an amount of from about 1 to about 30, preferably from about 5 to about 20, more preferably from about 7 to about 15, percent by weight based on the total weight of the aqueous solution. The tertiary alkanolamine is generally used in an amount of from about 25 to about 60, preferably from about 25 to about 40, more preferably from about 30 to about 40, percent by weight based on the total weight of the aqueous solution.

The process of the present invention can be carried out in any conventional equipment for the removal of acidic gases from fluids and detailed procedures are well known to a person of ordinary skill in the art. See, for example, U.S. Pat. No. 1,783,901 (Bottoms) and subsequent improvements which are known in the art.

The process according to the present invention can be conveniently carried out in any suitable absorber. The great number of absorbers used for gas purification operations include packed, plate, or spray towers. These absorbers are interchangeable to a considerable extent although certain specific conditions may favor one over the other. In addition to conventional packed, plate, or spray towers, specialized absorber towers have been developed to meet specific process requirements. Examples of these specific towers include impingement-plate scrubbers and turbulent contact scrubbers. The process of the present invention can be carried out in either packed, plate, or spray towers, and can contain other peripheral equipment as necessary for optimal process operation. Such peripheral equipment may include an inlet gas separator, a treated gas coalescor, a solvent flash tank, a particulate filter and a carbon bed purifier. The inlet gas flow rate vary depending on the size of the equipment but is typically between 5 and 100 million standard cubic feet per day (SCFD). The solvent circulation rate will depend on the amine concentration, the gas flow rate, gas composition, total pressure and treated fluid specification. The solvent circulation rate is typically between 5 and 5000 gallons per minute (gpm). Pressure inside the absorber can vary between 0 and 1200 psgi depending on the type of fluid being processed.

The absorbers, strippers and peripheral equipment useful for carrying out the process of the present invention are well known in the art and are described in many publications including the aforementioned references.

In the process of the present invention, a fluid containing an acid gas is contacted with an aqueous solution comprising an effective amount of an alkanolamine of formula I at a temperature of from about ambient temperature (approximately 25° C., 77° F.) up to about 93° C. (200° F.)

Temperatures inside the stripper tower, if one is employed, can vary between about 82° C. (180° F.) and about 127° C. (260° F.). The stripper overhead pressure is typically between 0 and about 20 psig. Optionally, corrosion inhibitors, scale inhibitors and antifoam agents may be employed.

The following examples are offered to illustrate but not limit the invention. Percentages, ratios and parts are by weight unless stated otherwise.

EXAMPLES 1 TO 3 AND COMPARATIVE EXAMPLES C-1 TO C-3

Dissolved $CO_2$ experiments were performed by sparging the compressed $CO_2$ (Liquid Carbonic HI-DRY Grade; greater than 99.99 percent purity) through a Cole-Palmer 0–150 ml/min. flowmeter at a rate of 50 ml/min. for about 90 min. into an aqueous solution (200 ml) comprising MDEA (2.94 mole; 35 percent) and an additive (1.68 mole) contained in a 250 ml jacketed beaker. The aqueous solution was stirred with a magnetic stir bar while continually sparging with $CO_2$. The temperature of the solution (about 31° C.) was adjusted using a GCA Precision R10 circulating bath and was monitored using a thermometer. A polycarbonate cover with slits for the thermometer, gas entrance and exit was used on top of the beaker to prevent $CO_2$ in the atmosphere from entering the solution. After about 90 minutes of continuous sparging, the solution was analyzed for dissolved $CO_2$ according to ASTM Method No. D 513 "Total and Dissolved $CO_2$ in Water". The additives used and results obtained are given in Table 1 below.

TABLE 1

$CO_2$ Reaction with MDEA/Additive

| Example | Aqueous Solution | Wt % $CO_2$ Absorbed in 90 minutes |
|---|---|---|
| 1 | MDEA + MBA (Run 1) | 4.25 |
| 2 | MDEA + MBA (Run 2) | 4.01 |
| 3 | MDEA + DBA | 3.76 |
| C-1 | MDEA + MEA | 4.16 |
| C-2 | MDEA + DEA | 3.76 |
| C-3 | MDEA + 1.68M EMEA | 3.71 |

This data shows that the aqueous solutions containing MBA absorbed more $CO_2$ than those containing DEA or EMEA. The amount of $CO_2$ absorbed by the solutions containing MBA (average: 4.13 percent by weight) is statistically similar to the amount of $CO_2$ absorbed by the solution containing MEA (4.16 percent by weight). likewise, the amount of $CO_2$ absorbed by the aqueous solution containing DBA is also statistically similar to amount of $CO_2$ absorbed by the aqueous solutions containing DEA or EMEA.

EXAMPLES 4 and 5 AND COMPARATIVE EXAMPLES C-4 and C-5

Autoclave degradation tests were performed on equimolar amine solutions using 0.050 mole of $CO_2$ per mole of amine at about 126.7° C. (260° F.). An aqueous solution (1100 ml.) containing MDEA (35 percent by weight; 2.94 mole) and either EMEA (15 percent by weight; 1.68 mole), DEA (17.7 percent by weight; 1.68 mole) or MBA (15 percent by weight; 1.68 mole) was added to a 2 liter Parr autoclave. Then each solution was loaded with $CO_2$ such that the $CO_2$ loading was about 0.050 mole of $CO_2$ per mole of total amine. The solution was then heated for 28 days at about 126.7° C. (260° F.). After 28 days, the solutions were analyzed by gas chromatography (GC) and gas chromatography/mass spectrometry (GC/MS) to determine the amount of the amine additive remaining in the solution and for the presence of degradation/conversion products. The results obtained are given in Table 2 below.

TABLE 2

Degradation Tests

| Example | Aqueous Solution | Amine Additive Remaining after 28 Days | Degradation / Conversion Product |
|---|---|---|---|
| 4 | MDEA + MBA (Run 1) | 15.1 wt % | none |
| 5 | MDEA + MBA (Run 2) | 14.99 wt % | none |
| C-4 | MDEA + EMEA | 10.6 wt % | yes (3 wt %) |
| C-5 | MDEA + DEA | 9.39 wt % | yes (2.2 wt %) |

This data clearly shows the unexpected advantage of MBA over EMEA and DEA. The data demonstrates that substantially all of MBA remains in the solution after 28 days with no detection of any degradation product while during the same time substantial amount of EMEA and DEA has been lost due to their reactivity with $CO_2$ and conversion into undesirable reaction products.

EXAMPLES 6 AND 7 AND COMPARATIVE EXAMPLES C-6 AND C-7

Autoclave degradation tests were performed on equimolar amine solutions using 0.050 mole of $CO_2$ per mole of amine at about 126.7° C. (260° F.) An aqueous solution (1100 ml.) containing MDEA (35 percent by weight) and either EMEA (15 percent by weight), BMEA (15 percent by weight), MBA (15 percent by weight), or DBA (15 percent by weight) was added to a 2 liter Parr autoclave. Then each solution was loaded with $CO_2$ such that the $CO_2$ loading was about 0.050 mole of $CO_2$ per mole of total amine. The solution was then heated for 28 days at about 126.7° C. (260° F.). After 28 days, the solutions were analyzed by gas chromatography (GC) and gas chromatography/mass spectrometry (GC/MS) to determine the amount of the amine additive remaining in the solution and for the presence of degradation/conversion products. The amount of EMEA, BMEA, MBA (two runs) and DBA remaining in the solution after 28 days was 10.6, 10.4, 15.1, 14.99 and 12.3 weight percent, respectively. EMEA converted to about 3 weight percent of N,N'-(2-hydroxyethyl)ethylene-diamine. BMEA converted to about 3.2 weight percent of N,N'-dibutyl-N-(2-hydroxyethyl)-ethylenediamine plus a small amount (less than 0.5 weight percent) of N-butyl-2-oxazolidinone. MBA showed very little degradation. Less than 0.2 weight percent what is possibly an oxazolidinone or substituted ethylenediamine was detected by GC and GC/MS. DBA converted to about 2.9 weight percent of a product that is preliminary identified as N-(2-hydroxy-butyl)-2-oxazolidinone by GC/MS analysis. The results are given in Table 3 below.

TABLE 3

Degradation Tests

| Example | Aqueous Solution | Amine Additive Remaining after 28 Days | Degradation / Conversion Product |
|---|---|---|---|
| 6 | MDEA + MBA (Run 1) | 15.1 wt % | yes (<0.2 wt %) |
| 7 | MDEA + MBA (Run 2) | 14.99 wt % | yes (<0.2 wt %) |

TABLE 3-continued

Degradation Tests

| Example | Aqueous Solution | Amine Additive Remaining after 28 Days | Degradation / Conversion Product |
|---|---|---|---|
| 8 | MDEA + DBA | 12.3 wt % | yes (2.9 wt %) |
| C-6 | MDEA + EMEA | 10.6 wt % | yes (3 wt %) |
| C-7 | MDEA + DEA | 9.39 wt % | yes (3.7 wt %) |

This data also shows the unexpected advantage of MBA and DBA over EMEA and BMEA. The data demonstrates that substantially all of MBA remains in the solution after 28 days with essentially no detection of any degradation product while during the same time substantial amount of EMEA and DEA has been lost due to their reactivity with $CO_2$ and conversion into undesirable reaction products.

EXAMPLE 9 AND COMPARATIVE EXAMPLE C-8

Autoclave degradation tests were performed on 2.80 mole amine solutions using 0.050 mole of $CO_2$ per mole of amine at about 126.7° C. (260° F.). An aqueous solution (1100 ml.) containing MEA (17.7 percent by weight, 2.80 mole) or MBA (25 percent by weight, 2.80 mole) was added to a 2 liter Parr autoclave. Then each solution was loaded with $CO_2$ such that the $CO_2$ loading was about 0.050 mole of $CO_2$ per mole of total amine. The solution was then heated for 28 days at about 126.7° C. (260° F.). After 28 days, the solutions were analyzed by gas chromatography (GC) and gas chromatography/mass spectrometry (GC/MS) to determine the amount of the amine additive remaining in the solution and for the presence of degradation/conversion products. The amount of MEA and MBA remaining in the solution after 28 days was 16.47 and 24.71 weight percent, respectively. GC and GC/MS did not positively identify any of small degradation peaks for either MEA or MBA runs. The results are given in Table 4 below.

TABLE 4

Degradation Tests

| Example | Aqueous Solution | Amine Additive Remaining after 28 Days | Degradation |
|---|---|---|---|
| 9 | MBA | 24.71 wt % | 1.2 wt % |
| C-8 | MEA | 16.47 wt % | 6.9 wt % |

What is claimed is:

1. An aqueous solution adapted for use in the removal of acidic gases from a fluid stream containing same, said aqueous solution comprising an effective amount for removal of acid gases of an alkanolamine of the formula $$R—NHCH_2CH(OH)CH_2CH_3 \quad (I)$$

or mixtures thereof wherein R is H, —$CH_2CH(OH)$ $CH_2CH_3$, an alkyl group having from 1 to 6 carbon atoms, an aryl group having from 6 to 12 carbon atoms, an aralkyl group having from 6 to 12 carbon atoms, or a cycloalkyl group having from 3 to 6 carbon atoms in combination with a tertiary alkanolamine.

2. The aqueous solution of claim 1 wherein the alkanolamine of formula I is present in an amount of from about 1 to about 30 percent and the tertiary alkanolamine is present in an amount of from about 25 to about 60 percent.

3. The aqueous solution of claim 2 wherein the tertiary alkanolamine is present in an amount of from about 25 to about 40 percent.

4. The aqueous solution of claim 2 wherein the tertiary alkanolamine is present in an amount of from about 30 to about 40 percent.

5. The aqueous solution according to claim 1 wherein the tertiary alkanolamine is selected from the group consisting of methyldiethanolamine, dimethylethanolamine and triethanolamine.

6. The aqueous solution according to claim 1, wherein R in formula I is H, —$CH_2CH(OH)CH_2CH_3$, or an alkyl group having from 1 to 6 carbon atoms.

7. The aqueous solution according to claim 1, wherein R in formula I is H, —$CH_2CH(OH)CH_2CH_3$, or an alkyl group having from 1 to 4 carbon atoms.

8. The aqueous solution according to claim 1, wherein the alkanolamine of formula I is selected from the group consisting of 1-amino-2-butanol, bis(2-hydroxybutyl)amine, N-methyl-2-hydroxybutylamine and N-ethyl-2-hydroxybutylamine.

9. The aqueous solution according to claim 8 wherein the alkanolamine of formula I is 1-amino-2-butanol.

10. The aqueous solution according to claim 9 wherein 1-amino-2-butanol is present in an amount of from about 1 to about 30 percent by weight and a tertiary alkanolamine is methyldiethanolamine present in an amount of from about 25 to 60 percent by weight.

11. The aqueous solution according to claim 10 wherein 1-amino-2-butanol is present in an amount of from about 5 to about 20 percent by weight.

12. The aqueous solution according to claim 11 wherein 1-amino-2-butanol is present in an amount of from about 7 to about 15 percent by weight.

13. The aqueous solution according to claim 8 wherein the alkanolamine of formula I is bis(2-hydroxybutyl)amine.

14. The aqueous solution according to claim 13 wherein bis(2-hydroxybutyl)amine is present in an amount of from about 5 to about 20 percent by weight and a tertiary alkanolamine is methyldiethanolamine present in an amount of from about 25 to 60 percent by weight.

15. The aqueous solution according to claim 14 wherein bis(2-hydroxybutyl)amine is present in an amount of from about 7 to about 15 percent by weight.

16. The aqueous solution according to claim 8 wherein the alkanolamine of formula I is a mixture of 1-amino-2-butanol and bis(2-hydroxybutyl)amine.

17. The aqueous solution of claim 5 wherein the alkanolamine of formula I is present in an amount of from about 5 to about 20 percent.

18. The aqueous solution of claim 5 wherein the alkanolamine of formula I is present in an amount of from about 7 to about 15 percent.

19. A process for removing acidic gases from a fluid stream containing same, said process comprising contacting said fluid stream with an aqueous solution comprising an effective amount of an alkanolamine of the formula $$R—NHCH_2CH(OH)CH_2CH_3 \quad (I)$$

or mixtures thereof wherein R is H, —$CH_2CH(OH)$ $CH_2CH_3$, an alkyl group having from 1 to 6 carbon atoms, an aryl group having from 6 to 12 carbon atoms, an aralkyl group having from 6 to 12 carbon atoms, or a cycloalkyl group having from 3 to 6 carbon atoms.

20. The process according to claim 19 wherein the alkanolamine of formula I is present in an amount of from about 7 to about 50 percent by weight.

21. The process according to claim 19 wherein the alkanolamine of formula I is present in an amount of from about 15 to about 40 percent by weight.

22. The process according to claim 19 wherein the alkanolamine of formula I is present in an amount of from about 20 to about 30 percent by weight.

23. The process according to claim 19 wherein the aqueous solution further comprises a tertiary alkanolamine.

24. The process according to claim 23 wherein the alkanolamine of formula I is present in an amount of from about 1 to about 30 percent and the tertiary alkanolamine is present in an amount of from about 25 to about 60 percent.

25. The process according to claim 23 wherein the tertiary alkanolamine is selected from the group consisting of methyldiethanolamine, dimethylethanolamine and triethanolamine.

26. The process according to claim 19 or claim 23 wherein R in formula I is H, —$CH_2CH(OH)CH_2CH_3$, or an alkyl group having from 1 to 6 carbon atoms.

27. The process according to claim 19 or claim 23 wherein R in formula I is H, —$CH_2CH(OH)CH_2CH_3$, or an alkyl group having from 1 to 4 carbon atoms.

28. The process according to claim 19 or claim 23 wherein the alkanolamine of formula I is selected from the group consisting of 1-amino-2-butanol, bis(2-hydroxybutyl)amine, N-methyl-2-hydroxybutylamine and N-ethyl-2-hydroxybutylamine.

29. The process according to claim 28 wherein the alkanolamine of formula I is 1-amino-2-butanol.

30. The process according to claim 29 wherein 1-amino-2-butanol is present in an amount of from about 1 to about 30 percent by weight and the solution further contains methyldiethanolamine in an amount of from about 25 to 60 percent by weight.

31. The process according to claim 30 wherein 1-amino-2-butanol is present in an amount of from about 5 to about 20 percent by weight.

32. The process according to claim 31 wherein 1-amino-2-butanol is present in an amount of from about 7 to about 15 percent by weight.

33. The process according to claim 28 wherein the alkanolamine of formula I is bis(2-hydroxybutyl)amine.

34. The process according to claim 33 wherein bis(2-hydroxybutyl)amine is present in an amount of from about 5 to about 20 percent by weight and the solution further contains methyldiethanolamine in an amount of from about 25 to 60 percent by weight.

35. The process according to claim 34 wherein bis(2-hydroxybutyl)amine is present in an amount of from about 7 to about 15 percent by weight.

36. The process according to claim 28 wherein the alkanolamine of formula I is a mixture of 1-amino-2-butanol and bis(2-hydroxybutyl)amine.

* * * * *